Feb. 22, 1944.                    A. SCOTT                    2,342,496
                                   OVEN
                              Filed May 8, 1941                2 Sheets-Sheet 1

Inventor
Alice Scott
By L. F. Pendreth
                    Attorney

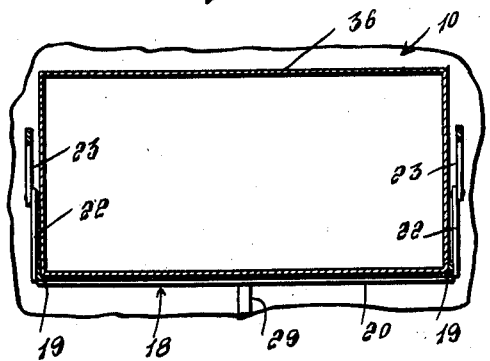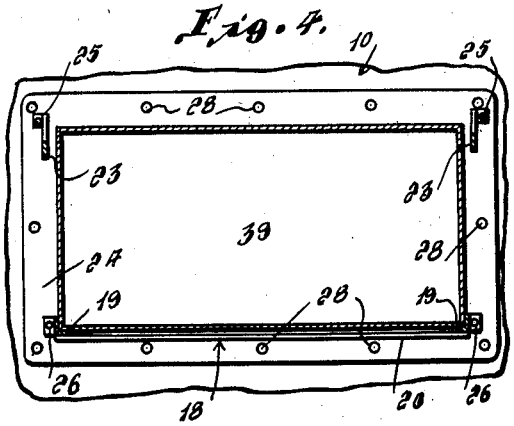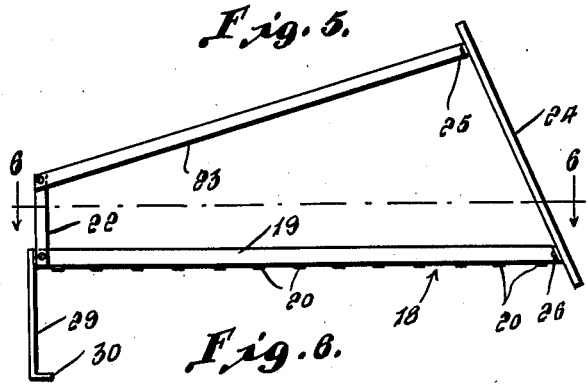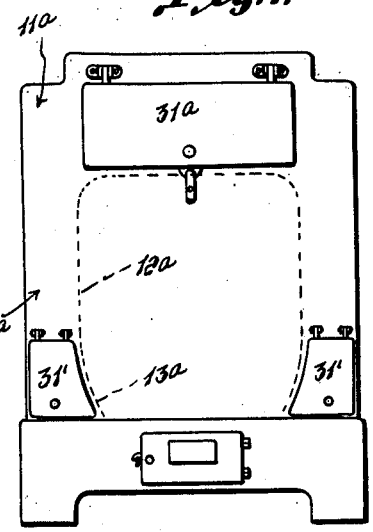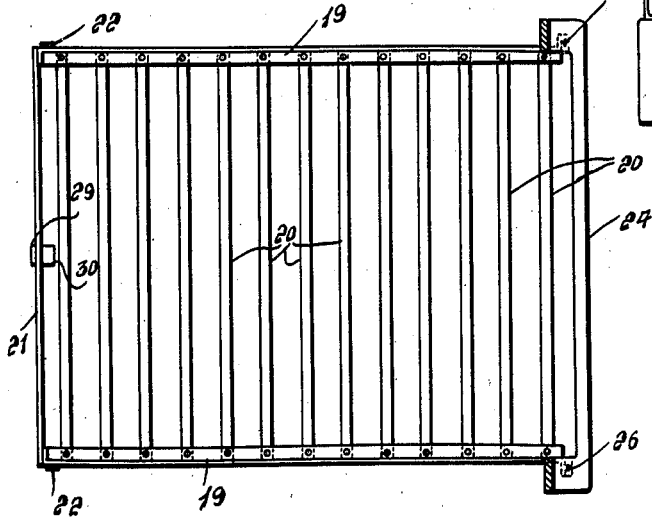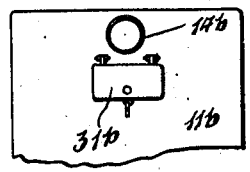

Patented Feb. 22, 1944

2,342,496

UNITED STATES PATENT OFFICE 2,342,496

OVEN

Alice Scott, Grand Rapids, Minn.

Application May 8, 1941, Serial No. 392,544

2 Claims. (Cl. 126—100)

This invention relates to an oven attachment for hot air furnaces or heating stoves and provides means whereby baking and other types of slow cooking may be accomplished while utilizing heat from a furnace or heating stove thereby saving the cost of fuel required to heat an oven of a cooking stove or range.

The term "heating stove" as herein used is intended to distinguish between a stove which is intended for use primarily for heating a room or other area and a range or cooking stove, primarily intended for the purpose of cooking.

It is a particular aim of the invention to provide an oven attachment for heating stoves and furnaces adapted to be mounted in available space between a portion of the wall of a furnace or stove casing and the stove or furnace body or fire pot to utilize available space otherwise only used for the circulation of hot air around the stove body and fire pot.

Still another aim of the invention is to provide an oven attachment including a rack or frame of open work material for removably supporting an oven in the stove or furnace casing so that the oven may be readily removed when not in use and when removed hot air can circulate through the frame or rack which will not materially affect the normal air circulation within the furnace casing.

Still another aim of the invention is to provide an attachment including a rack or open work frame for removably supporting an oven and which can be employed, with the oven removed, for supporting a casserole, potatoes or the like, for the purpose of baking.

Figure 1:
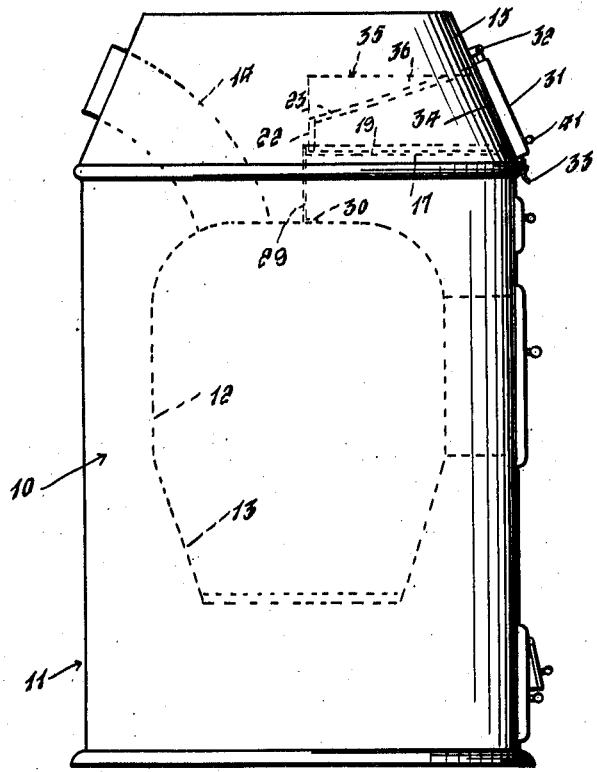
Figure 2:
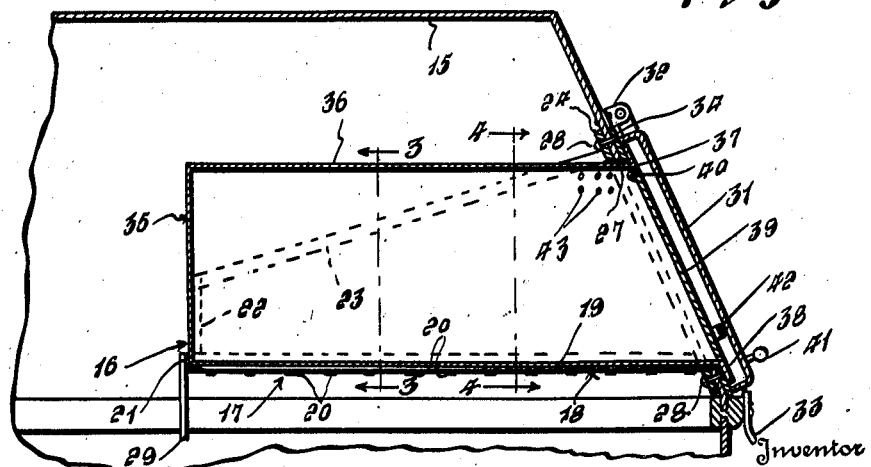

Other objects and advantages of the invention will hereinafter become more fully apparent from the following description of the drawings, which illustrate preferred embodiments of the invention, and wherein:

Figure 1 is a side elevational view of a conventional hot air furnace or heating stove, and showing the invention, in dotted lines, disposed within the casing thereof, Figure 2 is an enlarged fragmentary vertical sectional view of the upper portion or bonnet of the casing, and showing the attachment mounted therein, Figures 3 and 4 are cross sectional views taken substantially along the planes of the lines 3—3 and 4—4, respectively, of Figure 2, Figure 5 is a side elevational view showing the rack or frame detached, Figure 6 is a horizontal sectional view of the same taken substantially along the plane of the line 6—6 of Figure 5, Figure 7 is a front elevational view showing another construction of the stove or furnace and which is equipped with a plurality of oven attachments, and Figure 8 is a fragmentary rear elevational view of the stove or furnace illustrating another arrangement of the oven attachment.

Referring more particularly to the drawings, wherein like reference characters designate like or corresponding parts throughout the different views, for the purpose of illustration, 10 designates generally a conventional hot air furnace or heating stove including a casing, designated generally 11 in which is disposed a body 12 having a fire pot 13 therebeneath. A smoke stack 14 extends upwardly from the top of the body 12 and is curved rearwardly and extends outwardly through the back portion of the upper part or bonnet 15 of the casing 11.

The invention, designated generally 16 and comprising an attachment for the stove or furnace 10, includes an open work rack or supporting frame, designated generally 17 which is disposed within the bonnet 15. The rack or frame 17 includes a bottom, designated generally 18, which comprises longitudinal side members 19 connected by a plurality of transverse bars 20, which are disposed in spaced apart relationship to one another, as best seen in Figures 2 and 6. The bottom 18, at its inner end, is provided with a cross bar 21 which extends transversely thereacross and which rises above the level of the remainder of the bottom 18, for a purpose which will hereinafter become apparent. At the inner end of the bottom 18, a pair of upright members 22 are attached. A side member 23 is attached at one end thereof to each of the members 22. The side members 23 extend from the upper ends of the members 22 forwardly and are inclined upwardly. The opposite, forward ends of the members 23 are attached to a rectangular frame 24, adjacent the top thereof, as seen at 25, and the forward ends of the members 19 are attached, as seen at 26, to the frame 24, adjacent its bottom. The side members 19, as best seen in Figure 6, are preferably formed of angle iron. The bonnet or top portion 15 of the casing is provided with an opening 27 around the inner side of which the rectangular frame 24 is disposed. Frame 24 is secured to the bonnet 15, around the opening 27 by means of a plurality of rivets or other fastenings 28, and as best seen in Figures 2 and 5, the frame 24 is disposed at an oblique angle to the bottom 18 to conform to the inclination of the bonnet 15 so as to support the rack or frame 17 in substantially a horizontal position within the bonnet. A depending leg or supporting brace 29 is secured to and depends from the member 21 and has a foot portion 30 in its lower end which rests on the top of the body 12 for bracing the inner, free end of the rack 17, as best seen in dotted lines in Figure 1.

A door 31 is hingedly mounted at 32 on the outer side of the bonnet 15 above the opening 27 and is arranged to swing upwardly toward an open position and downwardly toward a closed position. A pivotally mounted latch member 33 is disposed below the opening 27 and on the outer side of the casing 11 for engaging a portion of the lower, free end of the closure 31 for releasably retaining it in a closed position. A gasket 34 of asbestos or similar material is secured to the outer side of the bonnet 15, around the opening 27, by means of the fastenings 28. The door 31 has an inwardly offset rim portion which seats against the gasket 34, when in a closed position, as best illustrated in Figure 2, for effectively sealing the opening 27.

An oven, designated generally 35, comprises an elongated rectangular body portion 36 including a closed inner end and sides and an open outer end 37 having an outwardly projecting marginal flange 38. The open end and flange are inclined upwardly and inwardly and are disposed substantially at the same angle to the longitudinal axis of the body portion 36 as the frame 24 is disposed to the bottom 18. The oven 35 is provided with a door or closure 39 for closing its open end 37 and which is hinged at 40 adjacent the top of the open end 37 to swing upwardly and outwardly toward an open position. The doors 31 and 39 are provided with handles 41 and 42, respectively, on their outer sides and adjacent their lower, free ends by means of which said doors may be moved to open or closed positions, and the door 39 is adapted to be retained in a closed position by gravity, due to the inclination of the open end 37.

The oven 35 is sized to fit the rack 17 onto which it is to be slid when the door 31 is in an open position and when fully inserted, as seen in Figure 2, the flange 38 will rest flush against a portion of the gasket 34. The bars 22 and 23 form side supports for the oven 35 which, however, is also held against lateral movement by engagement of the flange 38 with the gasket 34.

From the foregoing it will be obvious that the door 31 may be readily opened for inserting or removing the oven 35 and said oven, when in position on the rack 17 can be used as a conventional oven of a cook stove or range. When oven 35 is removed the open work construction of the rack or supporting frame 17 will not materially impede the free circulation of hot air through the bonnet 15 and may also be used for baking to support casseroles, potatoes or other articles, not shown. The oven 35 is preferably provided with apertures 43, as seen in Figure 2, for the escape of steam and food odors from the oven.

It is to be understood that the oven may be located in other portions of the heating stove or furnace casing wherever there is available space and may be made in various sizes depending upon the space available. In Figure 7, another construction of conventional cooking or heating stoves, designated generally 10a is illustrated having a casing 11a, a body 12a and a fire pot 13a. With this construction of stove or furnace an oven, including a rack, not shown, may be mounted in the upper portion of the casing 11a to which access may be had through the closure 31a. Also, two smaller ovens and racks, not shown, may be mounted one on either side of the fire pot 13a to which access may be had through the doors or closures 31'.

In Figure 8, which shows a portion of a furnace casing 11b, on a reduced scale, an oven and rack, not shown, are adapted to be mounted in the back portion of the upper part of the casing 11b beneath the smoke stack 14b and to which access can be had through the closure 31b.

Various modifications and changes in the construction and arrangement of the parts forming the invention are contemplated and may obviously be resorted to as only preferred embodiments of the invention have been disclosed.

I claim as my invention:

1. An attachment for hot air furnaces or heating stoves having a casing, a firepot therein, a dome equipped with an oblique wall having an opening, a rack disposed in the dome and having a frame disposed at the same angle as said wall and at its outer surface secured to the inner side of the wall around the opening, said rack having an open work bottom and an angularly disposed bar along each side thereof above the bottom and forming the sides of the rack, said openwork bottom including angle bars at the sides thereof, a leg depending from the inner end of the bottom and adapted to rest on the top of the fire pot for supporting the inner end of the rack, a door hingedly mounted on the outer side of the casing for closing the opening, an oven removably supported by the rack and slidable on said angle bars, said oven having a flanged open end, the flange engaging against the outer side of the casing and around the opening, when the oven is in a fully inserted position, and a door hingedly connected to the oven for closing the open end thereof and disposed on the outer side of the casing and beneath the first mentioned door, when the doors are in closed positions.

2. An attachment for hot air furnaces or heating stoves comprising a rack disposable in the dome thereof, said rack having a frame obliquely disposed at its outer surface adapted for engagement with and fastening to the inner side of a wall of the dome of the furnace around an opening therein, said rack having an openwork bottom and angle bars disposed along each side thereof above the bottom and forming the sides of the rack, said openwork bottom including angle bars at the sides thereof at the bottom, a leg depending from the inner end of the bottom and adapted to rest on the fire pot of the furnace to support the inner end of the rack, and an oven slidably supported by the second-mentioned angle bars.

ALICE SCOTT.